United States Patent
Guichard et al.

(10) Patent No.: US 9,660,909 B2
(45) Date of Patent: May 23, 2017

(54) NETWORK SERVICE HEADER METADATA FOR LOAD BALANCING

(71) Applicant: CISCO TECHNOLOGY, INC., San Jose, CA (US)

(72) Inventors: James N. Guichard, New Boston, NH (US); Paul Quinn, Wellesley, MA (US); David D. Ward, Los Gatos, CA (US); Carlos M. Pignataro, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 135 days.

(21) Appl. No.: 14/664,629

(22) Filed: Mar. 20, 2015

(65) Prior Publication Data
US 2016/0173373 A1    Jun. 16, 2016

Related U.S. Application Data

(60) Provisional application No. 62/090,821, filed on Dec. 11, 2014.

(51) Int. Cl.
*H04L 12/741* (2013.01)
*H04L 29/06* (2006.01)
(Continued)

(52) U.S. Cl.
CPC .......... *H04L 45/74* (2013.01); *H04L 67/1023* (2013.01); *H04L 69/22* (2013.01);
(Continued)

(58) Field of Classification Search
CPC .......... H04L 29/08711; H04L 67/2804; H04L 45/38; H04L 47/2441; H04L 67/327;
(Continued)

(56) References Cited

U.S. PATENT DOCUMENTS

| 7,860,100 B2 * | 12/2010 | Khalid | ................ H04L 41/5003 370/229 |
| 2003/0026257 A1 | 2/2003 | Xu | |

(Continued)

FOREIGN PATENT DOCUMENTS

| WO | WO2006/073804 | 7/2006 |
| WO | WO2016/094907 | 6/2016 |

OTHER PUBLICATIONS

PCT Mar. 22, 2016 International Search Report and Written Opinion of the International Searching Authority from International Application PCT/US2015/065610; 13 pages.
(Continued)

*Primary Examiner* — Ahmed Elallam
(74) *Attorney, Agent, or Firm* — Patent Capital Group

(57) ABSTRACT

A method for load balancing based on metadata in a network service header. The method includes receiving a packet or frame of a traffic flow, wherein the packet or frame has a payload and the network service header including metadata and service path information for the traffic flow identifying the service path, and the metadata comprises classification information of the packet or frame, extracting, by a service header processor of the load balancer, the classification information of the metadata from the packet or frame, and applying, by a load balancing function of the load balancer, a load balancing policy on the packet or frame based on the classification information of the metadata.

20 Claims, 6 Drawing Sheets

(51) Int. Cl.
*H04W 72/04* (2009.01)
*H04L 12/721* (2013.01)
*H04L 12/851* (2013.01)
*H04L 29/08* (2006.01)

(52) U.S. Cl.
CPC ......... *H04W 72/0486* (2013.01); *H04L 45/38* (2013.01); *H04L 47/2441* (2013.01); *H04L 67/327* (2013.01)

(58) Field of Classification Search
CPC . H04L 69/22; H04L 47/2458; H04L 67/1004; H04L 47/20; H04L 47/10; H04L 41/50; H04L 47/2425; H04W 72/0486
See application file for complete search history.

(56) References Cited

U.S. PATENT DOCUMENTS

| | | | |
|---|---|---|---|
| 2006/0031374 A1 | 2/2006 | Lu et al. | |
| 2007/0237147 A1 | 10/2007 | Quinn et al. | |
| 2008/0177896 A1 | 7/2008 | Quinn et al. | |
| 2009/0037713 A1 | 2/2009 | Khalid et al. | |
| 2010/0058329 A1 | 3/2010 | Durazzo et al. | |
| 2010/0165985 A1 | 7/2010 | Sharma et al. | |
| 2011/0023090 A1 | 1/2011 | Asati et al. | |
| 2013/0163594 A1 | 6/2013 | Sharma et al. | |
| 2013/0238806 A1* | 9/2013 | Moen | H04L 12/2872 709/227 |
| 2013/0272305 A1* | 10/2013 | Lefebvre | H04L 47/24 370/392 |
| 2014/0010083 A1* | 1/2014 | Hamdi | H04L 47/193 370/235 |
| 2014/0321459 A1* | 10/2014 | Kumar | H04L 47/2425 370/360 |
| 2014/0334488 A1 | 11/2014 | Guichard et al. | |
| 2014/0362857 A1* | 12/2014 | Guichard | H04L 45/566 370/392 |
| 2015/0092564 A1* | 4/2015 | Aldrin | H04L 41/5038 370/241.1 |
| 2015/0131484 A1* | 5/2015 | Aldrin | H04L 41/12 370/254 |
| 2015/0236948 A1* | 8/2015 | Dunbar | H04L 45/22 370/225 |
| 2015/0326473 A1* | 11/2015 | Dunbar | H04L 12/4633 370/392 |
| 2015/0333930 A1* | 11/2015 | Aysola | H04L 63/0471 370/392 |
| 2015/0341285 A1* | 11/2015 | Aysola | H04L 63/0428 370/392 |
| 2016/0028640 A1* | 1/2016 | Zhang | H04L 45/306 370/389 |
| 2016/0043952 A1* | 2/2016 | Zhang | H04L 67/16 709/223 |
| 2016/0164776 A1* | 6/2016 | Biancaniello | H04L 45/306 370/392 |
| 2016/0248685 A1 | 8/2016 | Pignataro | |

OTHER PUBLICATIONS

USPTO Aug. 25, 2016 Non-Final Office Action from U.S. Appl. No. 14/631,595.
U.S. Appl. No. 14/631,595, filed Feb. 25, 2015 entitled "Metadata Augmentation in a Service Function Chain," Inventors: Carlos M. Pignataro et al.
Bremier-Barr, et al., "Deep Packet Inspection as a Service," CoNEXT '14, Dec. 2-5, 2014, Sydney, Australia; 12 pages; http://conferences2.sigcomm.org/co next/2014/CoNEXT_papers/p271.pdf.
Quinn, P., et al., "Network Service Chaining Problem Statement," Network Working Group, Aug. 26, 2013, 18 pages; https://tools.ietf.org/html/draft-quinn-nsc-problem-statement-03.
Quinn, P., et al., "Network Service Header," Network Working Group, Jul. 3, 2014, 27 pages; https://tools.ietf.org/html/draft-quinn-sfc-nsh-03.txt.
Kumbhare, et al., "OpenDaylight Service Function Chaining Use-Cases," Ericsson, Oct. 14, 2014, 25 pages.
"Service-Aware Network Architecture Based on SDN, NFV, and Network Intelligence," Intel White Paper, Intel Architecture Processors, Qosmos* DPI Technology, Networking and Communications, Nov. 11, 2014, 8 pages.
Halpern, J., et al., "Service Function Chaining (SFC) Architecture," Network Working Group, Sep. 20, 2014, 26 pages; https://tools.ietf.org/html/draft-ietf-sfc-architecture-02.
Quinn, et al., "Service Function Chaining Creating a Service Plane Using Network Service Header (NSH)," published Nov. 19, 2014, 20 pages; https://www.opennetworking.org/images/stories/downloads/sdn-resources/IEEE-papers/service-function-chaining.pdf.
USPTO Dec. 9, 2016 Notice of Allowance from U.S. Appl. No. 14/631,595.

* cited by examiner

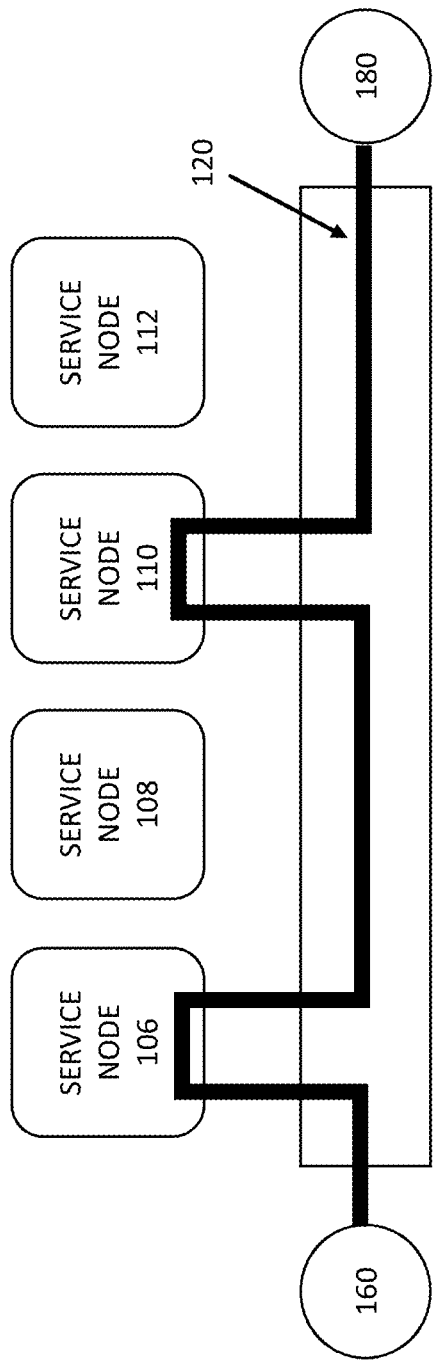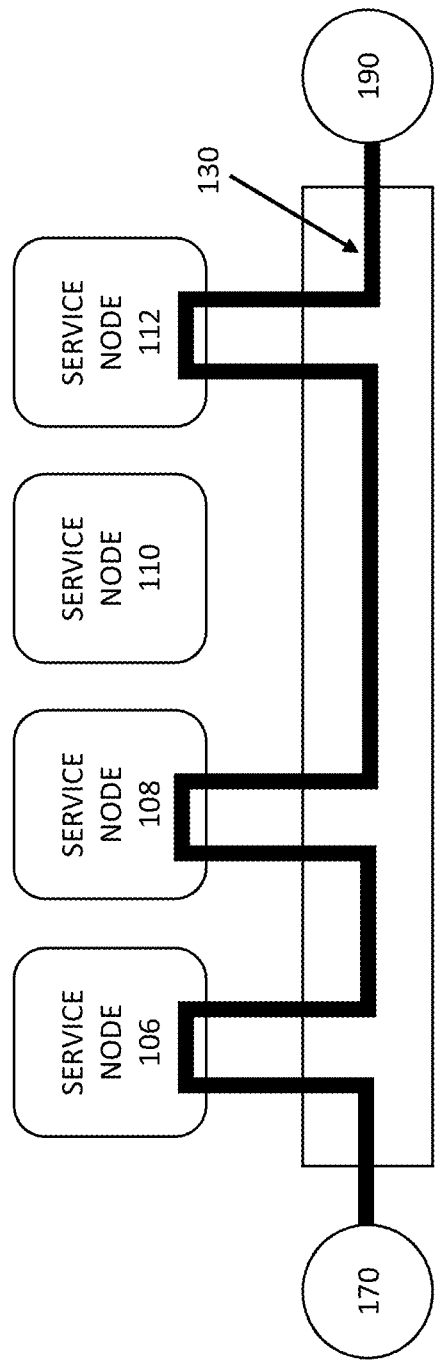

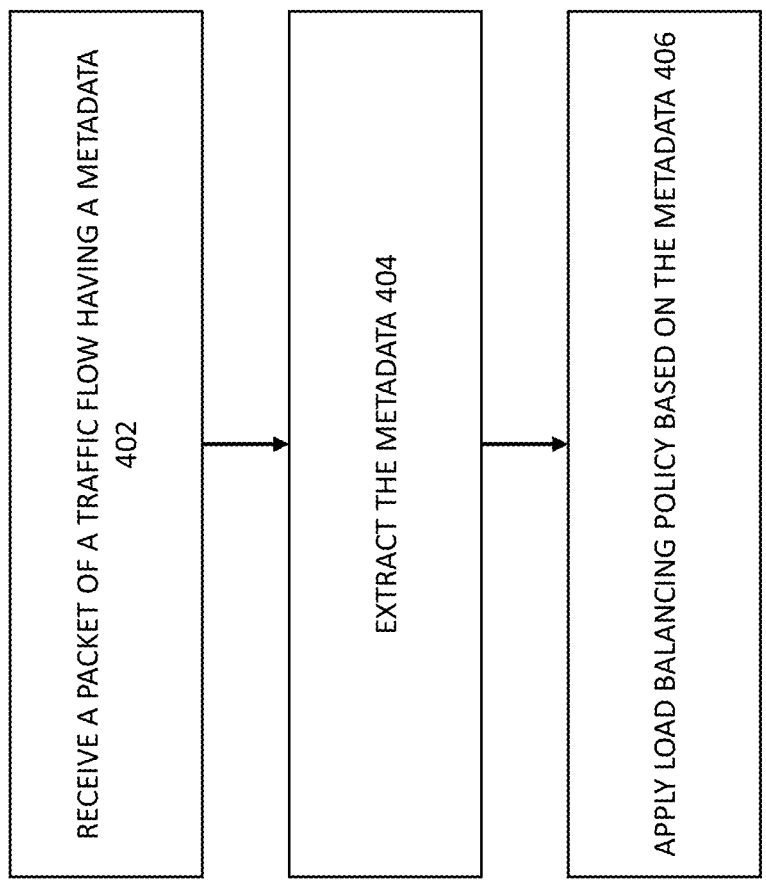

NETWORK SERVICE HEADER METADATA FOR LOAD BALANCING

CROSS-REFERENCE TO RELATED APPLICATION

This application claims the benefit of priority under 35 U.S.C. §119(e) to U.S. Provisional Application Ser. No. 62/090,821 entitled "METADATA AUGMENTATION IN A SERVICE FUNCTION CHAIN AND NETWORK SERVICE HEADER (NSH) METADATA BASED LOAD BALANCING" filed Dec. 11, 2014, which is hereby incorporated by reference in its entirety.

TECHNICAL FIELD

This disclosure relates in general to the field of communications and, more particularly, to using metadata in a network service header for load balancing.

BACKGROUND

In computer networking, network administrators are often concerned with how to best route traffic flows from one end point to another end point across a network. When provisioning a route for a traffic flow, administrators may implement policies to ensure that certain service functions are applied to the packet or the traffic flow as it traverses across the network. Service functions can provide security, wide area network (WAN) acceleration, and load balancing. These service functions can be implemented at various points in the network infrastructure, such as the wide area network, data center, campus, etc. Network elements providing these service functions are generally referred to as "service nodes."

Traditionally, service node deployment is dictated by the network topology. For instance, firewalls are usually deployed at the edge of an administrative zone for filtering traffic leaving or entering the particular zone according to a policy for that zone. With the rise of virtual platforms and more agile networks, service node deployment can no longer be bound by the network topology. To enable service nodes to be deployed anywhere on a network, a solution called Service Function Chaining (SFC) Architecture (IETF draft-ietf-sfc-architecture-04, Sep. 20, 2014) and Network Service Header (NSH) (IETF draft-quinn-sfc-nsh-03, Jul. 3, 2014) have been provided to encapsulated packets or frames to prescribe service paths for traffic flows through the appropriate service nodes. Specifically, Network Service Headers provide data plane encapsulation that utilizes the network overlay topology used to deliver packets to the requisite services.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 1B-C illustrate different service paths realized using service function chaining, according to some embodiments of the disclosure;

FIG. 4 shows a flow diagram illustrating a method for load balancing based on metadata in a network service header, according to some embodiments of the disclosure.

DETAILED DESCRIPTION OF EXAMPLE EMBODIMENTS

Overview

This present disclosure describes a method for load balancing based on metadata in a network service header. The method includes (1) receiving, at a load balancer in a service path, a packet or frame of a traffic flow, wherein the packet or frame has a payload and the network service header including metadata and service path information for the traffic flow identifying the service path, and the metadata comprises classification information of the packet or frame, (2) extracting, by a service header processor of the load balancer, the classification information of the metadata from the packet or frame, and (3) applying, by a load balancing function of the load balancer, a load balancing policy on the packet or frame based on the classification information of the metadata.

In some embodiments, the network service header that includes the metadata and the service path information is a result of an initial classification of the packet or frame performed by an initial service classifier. In some embodiments, the classification information of the packet or frame of the metadata originates from an orchestrator system external to a service path prescribed by the service path information. In some embodiments, the classification information of the packet or frame of the metadata is a result of metadata augmentation by a service node upstream of the load balancer in the service. In some embodiments, the metadata in the network service header comprises application information associated with the traffic flow.

In some embodiments, the load balancer is not capable of deducing the classification information of the packet or frame based on the packet or frame. In some embodiments, wherein applying the load balancing policy on the packet or frame does not include processing the payload of the packet or frame. In some embodiments, applying the load balancing policy on the packet or frame does not include processing the layer 7 Hypertext Transfer Protocol header of the packet or frame.

Example Embodiments

Basics of Network Service Chaining or Service Function Chains in a Network

To accommodate agile networking and flexible provisioning of network nodes in the network, Service Function Chains (SFC) can be used to ensure an ordered set of Service Functions (SF) to be applied to packets and/or frames of a traffic flow. SFCs provides a method for deploying SFs in a way that enables dynamic ordering and topological independence of those SFs. A service function chain can define an ordered set of service functions that is applied to packets and/or frames of a traffic flow, where the ordered set of service functions are selected as a result of classification.

The implied order may not be a linear progression as the architecture allows for nodes that copy to more than one branch. The term service chain is often used as shorthand for service function chain.

Figure 1A:
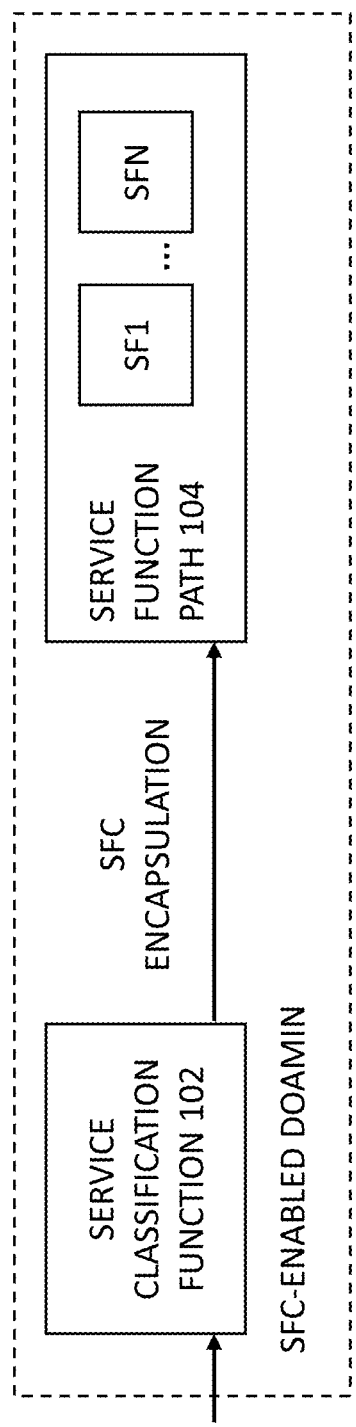
FIG. 1A illustrates a Service Function Chain (SFC), which may include an initial Classification function, as an entry point into a Service Function Path (SFP), according to some embodiments of the disclosure.

FIG. 1A illustrates a Service Function Chain (SFC), which may include an initial service classification function 102, as an entry point into a Service Function Path (SFP) 104 (or service path). The (initial) service classification function 102 prescribes a service path, and encapsulates a packet or frame with the service path information which identifies the service path. The classification potentially adds metadata, or shared context, to the SFC encapsulation part of the packet or frame. The service function path 104 may include a plurality of service functions (shown as "SF1", . . . "SFN"), implemented or provided by one or more service nodes.

A service function can be responsible for specific treatment of received packets. A service function can act at the network layer or other OSI layers (e.g., application layer, presentation layer, session layer, transport layer, data link layer, and physical link layer). A service function can be a virtual instance or be embedded in a physical network element such as a service node. When a service function or other modules of a service node is executed by the at least one processors of the service node, the service function or other modules can be configured to implement any one of the methods described herein. Multiple service functions can be embedded in the same network element. Multiple instances of the service function can be enabled in the same administrative SFC-enabled domain. A non-exhaustive list of SFs includes: firewalls, WAN and application acceleration, Deep Packet Inspection (DPI), server load balancers (SLBs), NAT44, NAT64, HOST_ID injection, HTTP Header Enrichment functions, TCP optimizer, application delivery controllers (ADCs) etc. An SF may be SFC encapsulation aware, that is it receives, and acts on information in the SFC encapsulation, or unaware in which case data forwarded to the service does not contain the SFC encapsulation.

A Service Node (SN) can be a physical network element (or a virtual element embedded on a physical network element) that hosts one or more service functions (SFs) and has one or more network locators associated with it for reachability and service delivery. In many standardization documents, "service functions" can refer to the service nodes described herein as having one or more service functions hosted thereon. Service Function Path (SFP) (or sometimes referred simply as service path) relates to the instantiation of a SFC in the network. Packets follow a service path from a classifier through the requisite service functions.

FIGS. 1B-C illustrate different service paths realized using service function chaining. These service paths can be implemented by encapsulating packets of a traffic flow with a network service header (NSH) or some other suitable packet header which specifies a desired service path (e.g., by identifying a particular service path using service path information in the NSH). In the example shown in FIG. 1B, a service path 120 can be provided between end point 160 and endpoint 180 through service node 106 and service node 110. In the example shown in FIG. 1C, a service path 130 (a different instantiation) can be provided between end point 170 and endpoint 190 through service node 106, service node 108, and service node 112.

Network Service Header (NSH) Encapsulation

Generally speaking, an NSH includes service path information, which can identify or prescribe a particular service path (an instance of a service function chain), and NSH is added to a packet or frame. For instance, an NSH can include a data plane header added to packets or frames. Effectively, the NSH creates a service plane. The NSH includes information for service chaining, and in some cases, the NSH can include metadata added and/or consumed by service nodes or service functions. The packets and NSH are encapsulated in an outer header for transport. To implement a service path, a network element such as a service classifier (SCL) or some other suitable SFC-aware network element can process packets or frames of a traffic flow and performs NSH encapsulation according to a desired policy for the traffic flow.

Figure 2:
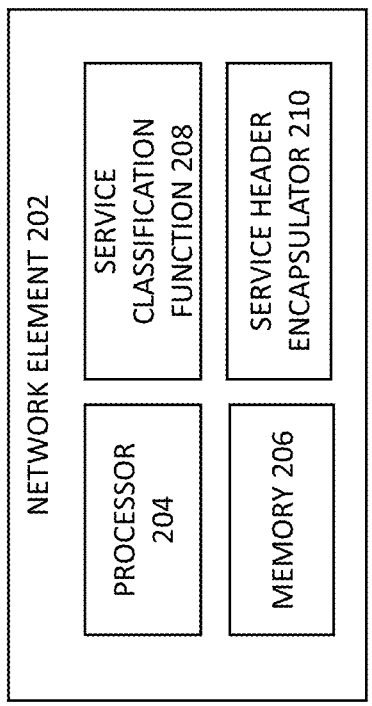
FIG. 2 shows a system view of a Service Chain Function-aware network element for prescribing a service path of a traffic flow, according to some embodiments of the disclosure.

FIG. 2 shows a system view of SFC-aware network element, e.g., such as a (initial) service classifier (SCL), for prescribing a service path of a traffic flow, according to some embodiments of the disclosure. Network element 202 includes processor 204, (computer-readable non-transitory) memory 206 for storing data and instructions. Furthermore, network element 202 includes service classification function 208 and service header encapsulator 210 (both can be provided by processor 204 when processor 204 executes the instructions stored in memory 206).

The service classification function 208 can process a packet of a traffic flow and determine whether the packet requires servicing and correspondingly which service path to follow to apply the appropriate service. The determination can be performed based on business policies and/or rules stored in memory 206. Once the determination of the service path is made, service header encapsulator 210 generates an appropriate NSH having identification information for the service path ("service path information") and adds the NSH to the packet. The service header encapsulator 210 provides an outer encapsulation to forward the packet to the start of the service path. Other SFC-aware network elements are thus able to process the NSH while other non-SFC-aware network elements would simply forward the encapsulated packets as is. Besides inserting an NSH, network element 202 can also remove the NSH if the service classification function 208 determines the packet does not require servicing.

Network Service Headers

A network service header (NSH) can include a (e.g., 64-bit) base header, and one or more context headers. Generally speaking, the base header provides information about the service header and service path identification (e.g., a service path identifier), and context headers can carry opaque metadata (such as the metadata described herein reflecting the result of classification). For instance, an NSH can include a 4-byte base header, a 4-byte service path header, and optional context headers. The base header can provide information about the service header and the payload protocol. The service path header can provide path identification and location within a path. The (variable length) context headers can carry opaque metadata and variable length encoded information. The one or more optional context headers make up a context header section in the NSH. For instance, the context header section can include one or more context header fields having pieces of information therein, describing the packet/frame.

The context header fields are particularly suitable for sharing context information about a packet or frame as the packet or frame traverses the service path. Based on the information in the base header, a service function of a service node can derive policy selection from the NSH. Context headers shared in the NSH can provide a range of service-relevant information such as traffic classification. Service functions can use NSH to select local service policy. A common usage is for service functions to deny or permit certain types of traffic based on the traffic classification in the context headers of the NSH.

Using Metadata in a Network Service Header for Load Balancing Decisions

A server load balancer (SLB) or Application Delivery Controller (ADC) is a network device that distributes traffic across a number of servers using load balancing algorithms (ranging from simple round robin to more sophisticated methods) based on e.g., L3 (Network layer, e.g., Internet Protocol (IP)), L4 (Transport layer, e.g., Transmission Control Protocol (TCP), User Datagram Protocol (UDP)), L5 (Session layer), L6 (Presentation layer), and/or L7 (Application layer) information in the packets. For instance, a load balancer may extract TCP/IP information from the packet to decide how to load balance the traffic flow across multiple servers. These devices, generally referred herein as "load balancers" are used to increase capacity and reliability of applications, increase scalability, and improve the overall performance by decreasing the burden on servers associated with the management of application sessions. Such load balancers rely heavily upon inspection of incoming packet flows (such as L4 and/or L7 information) to determine which classification rules to apply, or how to apply load balancing policies. Thus, the outcome of the load-balancing decision for a given traffic flow depends on the load balancer's classification of the packet or frame.

Some load balancers have sophisticated packet inspection capabilities; in many cases, load balancers extract the required information for load balancing decisions by, e.g., processing the L3, L4, L5, L6 and/or L7 headers from the packet, and/or processing the payload of the packet. This results in heavy processing loads on load balancers which may have to process a high volume of traffic flows. More significantly, classification information that is not conveyed within the packet (e.g., in the packet header and/or in the payload), such as classification information available via an external source(s), is generally not available to load balancers, even though said information could be utilized to greatly enhance their load-balancing capabilities. The present disclosure describes the use of metadata, carried in Network Service Header (NSH)'s context headers section, for load balancing decisions in addition to, or in lieu of, payload (i.e. original packet) information.

Metadata in Network Service Headers for Load Balancing

A load balancer can apply one or more load balancing policies, based on a variety of classification information of a packet/frame of a traffic flow. One example includes application-based load balancing, where a load balancing policy can load balance to different servers depending on the application with which a traffic flow is associated. To facilitate load balancing, the metadata in the network service header can include application information associated with the traffic flow (e.g., encoded value which identifies an application which with the traffic flow is associated). Information conveyed in the metadata of the network service header can include one or more of the following: information identifying the application type (e.g., Hypertext Transfer Protocol (HTTP) versus Simple Mail Transfer Protocol (SMTP), etc.), application data (e.g., a Uniform Resource Locator (URL), etc.), subscriber information (e.g., subscriber identifier, subscriber class, access level, etc.), service level information (e.g., gold service versus bronze service, etc.), Virtual Private Networks (VPN)/Virtual Routing and Forwarding (VRF) membership information, etc.

Within the context of the application, "metadata" refers to one or more pieces of information (e.g., bits of data, encoded values) in a context header section of a network service header. For instance, the metadata can include information used by a load balancer when applying a load balancing policy on a packet or frame. In some cases, the metadata can include encoded information which classifies of the packet or frame (e.g., a value which indicates the type of packet or frame).

Metadata can refer to contents of the entire context header section, which can include the contents of one or more context header fields describing various attributes of the packet/frame. Metadata can also refer to contents of one individual context header field or a subset of context header fields in the context header section. The context header section may have a plurality of fields in which metadata can be provided. Exemplary kinds of metadata can include:

Network platform context: provides platform-specific metadata shared between network nodes. Examples include (but are not limited to) ingress port information, forwarding context and encapsulation type;

Network shared context: metadata relevant to any network node such as the result of edge classification. For example, application information, identity information or tenancy information can be shared using this context header;

Service platform context: provides service platform specific metadata shared between service functions. This context header is analogous to the network platform context, enabling service platforms to exchange platform-centric information such as an identifier used for load balancing decisions; and Service shared context: metadata relevant to, and shared, between service functions. As with the shared network context, classification information such as application type can be conveyed using this context.

Exemplary Load Balancer and Method for Load Balancing Based on Metadata in the Network Service Header Once properly encapsulated, the packet having the NSH is then forwarded to one or more service nodes in the service path where service(s) can be applied to the packet/frame. One of such service node in the service path is a load balancer configured for load balancing based on metadata in the network service header.

Figure 3:
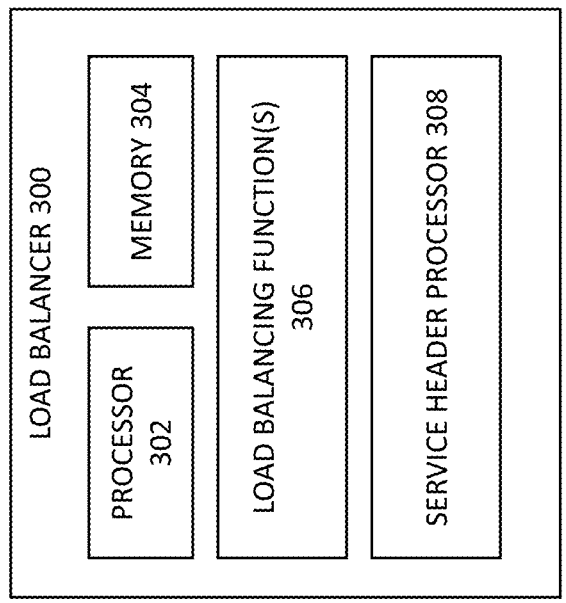
FIG. 3 shows a system view of load balancer, according to some embodiments of the disclosure.

FIG. 3 shows a system view of load balancer, according to some embodiments of the disclosure. Generally speaking, the load balancer 300 is a server load balancer (SLB) or an application delivery controller (ADC) in a service path. The service path is prescribed by the service path information in the network service header. Furthermore, the load balancer 300 can be a network device or network element that distributes traffic flow across a plurality of servers using one or more load balancing policies.

Load balancer 300, generally a network element, can include processor 302, (computer-readable non-transitory) memory 304 for storing data and instructions. The memory can store one or more load balancing policies that the load balancer 300 can apply to packets or frames of traffic flows. Furthermore, load balancer 300 includes load balancing function(s) 306 (e.g., for applying one or more load balancing policies to the packet/frame) and service header processor 308. The load balancing function(s) 306 and service header processor 306 can be provided by processor 302 when processor 302 executes the instructions stored in memory 304. Service header processor 308 can extract the NSH, and in some cases, update the NSH as needed. For instance, the service header processor 308 can decrement the service index if a service index=0 is used to indicate that a packet is to be dropped by a service node downstream from the load balancer in the service path. Furthermore, the service header processor 308 and/or the load balancing function(s) 306 can extract metadata in the network service header for load balancing decisions. In another instance, the service header processor 308 or some other suitable module provide by the service node can update context header fields if new/updated context is available.

The load balancer 300 can implement a method for load balancing based on metadata in a network service header. FIG. 4 shows a flow diagram illustrating such method for load balancing based on metadata in a network service header (NSH), according to some embodiments of the disclosure. The method includes receiving, at a load balancer in a service path, a packet or frame of a traffic flow (box 402). The packet or frame has a payload and the network service header. The network service header has metadata and service path information for the traffic flow identifying the service path. The metadata comprises classification information of the packet or frame. Advantageously, the metadata in the NSH allows load balancing decisions to be made by the load balancer. The method further includes extracting, by a service header processor of the load balancer, the classification information of the metadata from the packet or frame (box 404). For instance, the service header processor may process the packet to pass the metadata and/or a derivation thereof to a load balancing function in the load balancer. The method further includes applying, by the load balancing function of the load balancer, a load balancing policy on the packet or frame based on the classification information of the metadata. For instance, a load balancing policy may include one or more rules which takes the classification information as input and provide one or more load balancing decisions as output. The load balancing decision(s) based on the one or more load balancing policies may include forwarding the packet or frame to one of a plurality of servers being load balanced by the load balancer.

If an encoding scheme is used for encoding classification information in the metadata (e.g., if encoded values are being conveyed in context header fields as metadata in the network service header), the encoding scheme or semantics of the metadata can be received by the load balancer via a control plane of the service path or service function chain.

Sources of Metadata in the Network Service Header Used for Load Balancing

As described previously, a network service header provides the mechanisms for the construction of service chains in a network and the forwarding of traffic through those service chains using network service headers carried within the data plane. In addition to path information, NSH carries so-called metadata: information about the packet/chain. This metadata is carried in NSH itself, either as fixed-size words, or via variable TLVs. Typically this metadata reflects the result of antecedent classification. For example, application type and subscriber information are two commonly used metadata values. The metadata is carried along the service path and used, per service, for policy enforcement. Using the metadata examples above, a firewall would, for instance, be able to permit or deny a certain application or subscriber without having to classify the packets to determine the application or subscriber information. More importantly, in accordance with the embodiments described herein, load balancers can load balance traffic flows based on the metadata in the network service header.

In one example, the metadata in the network service header that includes the metadata and the service path information is a result of an initial classification of the packet or frame performed by an initial service classifier. Phrased differently, the metadata originates from a classification of the packet performed by the initial service classifier which prescribed the particular service path identified by the service path information of the network service header. The initial service classifier could generate such classification information in the metadata through packet/flow inspection.

In some cases, the classification information carried in NSH metadata is not something that can be derived via packet/flow inspection, rather it conveys information from an external source (i.e., a source external to the service path). For instance, the classification information of the packet or frame of the metadata can originate from an orchestrator system external to a service path prescribed by the service path information. Phrased differently, the classification information of the metadata is supplied by an orchestration system which is responsible for assigning workloads. An orchestration system places application workloads and therefore "knows" what application is running. The orchestration system, via a metadata application programming interface (API), informs the service-chaining infrastructure about the application types (i.e., classification information), and that classification information is then carried in the network service header as metadata.

In some cases, the classification information of the packet or frame of the metadata is a result of metadata augmentation by a service node upstream of the load balancer in the service. Metadata augmentation is a mechanism described by a related (co-pending) application Ser. No. 14/631,595, entitled "METADATA AUGMENTATION IN A SERVICE FUNCTION CHAIN", which is incorporated by reference in its entirety herein. Service nodes upstream can provide additional functionality by augmenting the metadata being used by the load balancer, e.g., by adding precision to the metadata and virtualizing the classification function over the service path. At the initial classifier, a packet or frame can be classified, where a first metadata in the NSH would reflect the classification. For example, the initial classifier can classify that the packet/frame of a traffic flow is associated with e.g., an "employee" or "guest". With augmentation, the first service node can also further classify the packet or frame as being associated with, e.g., application X, and accordingly generate a second metadata. The first service node can use this new information, i.e., the second metadata, to augment the first metadata. The NSH for the packet/frame can carry the second metadata, which augments the first metadata, as the packet/frame traverses to the subsequent service node(s) in the service path. When a load balancer receives the packet/frame with the second metadata, that second metadata can be used for load balancing, where the new information provided by the second metadata can affect how the load balancer processes the packet or frame. For instance, the second service node may decide to load balance the packet/frame differently based on the second metadata (as opposed to load balancing solely based on the first metadata without augmentation). The context being shared among service nodes is improved as the metadata is augmented when the packet/frame travels over the service path. The service nodes can optionally serve as a supplemental/ additional "classifier" in the service path by classifying the packet/frame using their own capabilities. Through augmentation, a service node in the service path can contribute to the information being shared over the service function chain. The semantics (e.g., meaning, encoding scheme) can be conveyed in-line (in the service plane) or in the control plane with the load balancer.

Metadata augmentation together with load balancing, i.e., load balancing based on augmented metadata, can be advantageous if the load balancer or the initial classifier does not have a particular classification functionality (or cannot conveniently or efficiently provide such functionality), or might not have information needed to know more about the packet. Common example is that the initial classifier is a hardware device that cannot look deep into the packet to get application information about the packet. The first service node, e.g., a firewall, a deep packet inspection engine, etc., may have greater classification capabilities. For instance, the initial classifier may provide first metadata which specifies the packet/frame as being associated with a guest (e.g., as opposed to an employee). A first service node, a deep packet inspection engine may find out that the packet/frame is associated with email (e.g., as opposed to streaming video content). The first service node can augment the first metadata by adding additional information, e.g., using second metadata which specifies the traffic is associated with email. A second service node, e.g., a load balancer, can process the packet/frame based on the second metadata accordingly. For instance, the load balancer can apply a policy based on the second metadata, wherein the policy may decide to load balance email traffic of guests differently from email traffic of employees, or load balance email traffic of guests differently from voice traffic of guests.

Exemplary Applications and Technical Advantages

Figure 5:
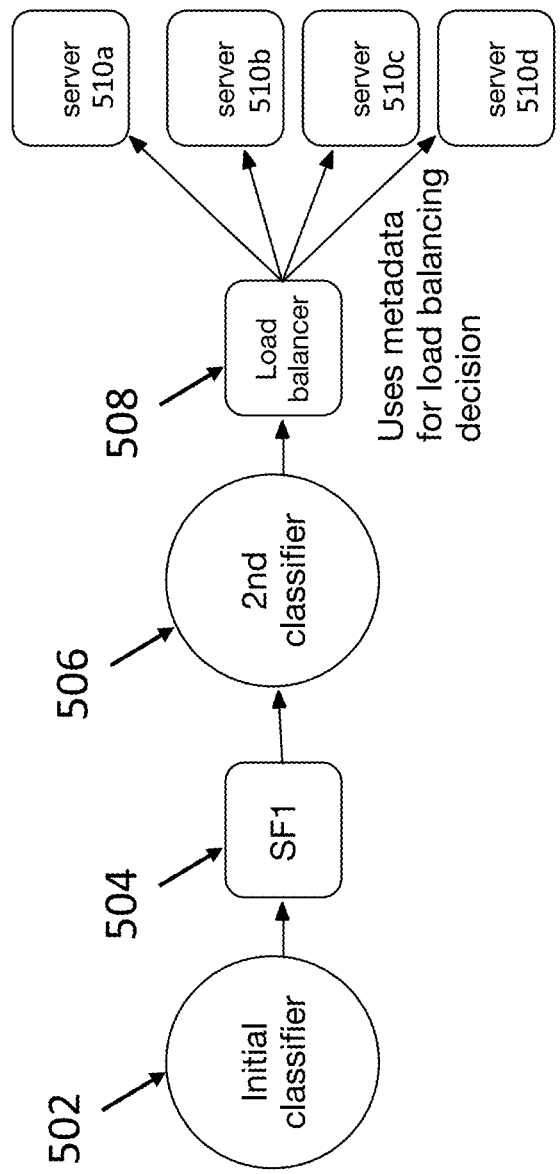
FIG. 5-6 illustrate an example of load balancing based on metadata in a network service header, according to some embodiments of the disclosure.
Figure 6:
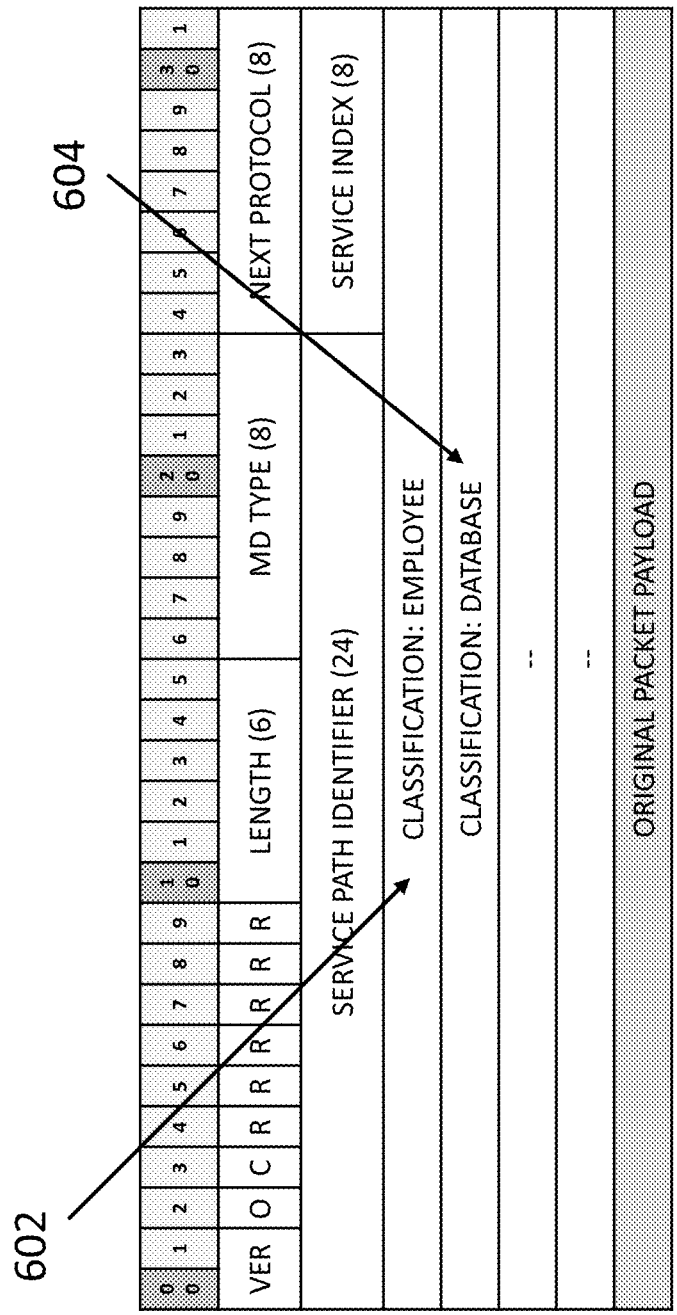

FIG. 5-6 illustrate an example of load balancing based on metadata in a network service header, according to some embodiments of the disclosure. Specifically, FIG. 5 shows a service path having an initial classifier 502, a service function SF1 504, a second classifier 506, and a load balancer 508 (which front ends servers 510a-d), and FIG. 6 shows an example of a packet/frame having the network service header carrying metadata that arrives at load balancer 508. In this example, the initial classifier 502 and/or the second classifier 506 may have classified the packet/frame as being associated with "employee", and provides metadata that includes such classification in the context header field 602 of FIG. 6. The initial classifier 502 and/or the second classifier 506 may have classified the packet/frame as being associated with "database", and provides metadata that includes such classification information in the context header field 604 of FIG. 6. In some cases, the classification information originated from an external source not in the service path (e.g., an orchestrator system). The load balancer 508 (similar to load balancer 300 of FIG. 3), upon receiving the packet/frame shown in FIG. 6, can extract the classification information "employee" and/or "database", and load balance the packet/frame accordingly. For instance, the load balancer 508 may have one or more load balancing policies which applies specifically to, e.g., traffic flows associated with "employee", traffic flows associated with "database", traffic flows associated with "employee"+"database", traffic flows associated with suitable classifications that could impact load balancing decisions, etc.

Load balancers, e.g., SLB/ADC devices often constitute part of an NSH service chain, and as such they can take advantage of the metadata for local policy application, in this case, load-balancing decisions. In many cases, load balancing based on metadata in the NSH is advantageous when the load balancer is not capable of deducing the classification information of the packet or frame of the metadata based on the packet or frame itself (i.e., the payload, or L4/L7 header information).

In some other cases, even if the load balancer can deduce the classification information from the packet or frame, the metadata having the classification information makes it easier for the load balancer to simply load balance based on the metadata without excessive processing of the packet/frame. Phrased differently, applying the load balancing policy on the packet or frame does not include processing the payload of the packet or frame (to obtain classification information of the packet/frame). Consider an SLB/ADC that front ends a set of web servers accessed by application Universal Resource Locator (URL). The SLB/ADC thus load balances traffic flows across the web servers based on the application URL (i.e., the classification information). In the conventional technique the SLB/ADC must examine the L7 HTTP headers to determine the URL being accessed and then use this information to determine, based on a load balancing policy, which web server to use to service a particular packet flow. Using the NSH metadata as described in this present disclosure, the SLB/ADC can extract the URL information and apply the load balancing policy without needing to parse through the entire L7 HTTP header. Phrased differently, applying the load balancing policy on the packet or frame does not include processing the layer 7 Hypertext Transfer Protocol header of the packet or frame. Effectively, the classification information, e.g., the application information, is inserted and conveyed as NSH metadata, which a load balancer can use for load balancing purposes, and in lieu of having the load balancer to parse for URL or other packet information. Advantageously, the SLB/ADC's load balancing function can apply the load balancing policy simply based on the application information in NSH to make its policy decision, and even leverage the metadata to make policy decisions based on information that a SLB cannot derive absent of the classification information conveyed as NSH metadata. Such metadata being used for load balancing can include one or more of the following: packet-centric information, the use of metadata derived from external sources as described above, and augmented metadata.

By adding this type of information to the NSH metadata the LB algorithms may be greatly enhanced leading to simpler and more sophisticated LB functionality. Advantages of such use of metadata include, but are not limited to: (1) SLB/ADC does not have to parse through packets looking for information to load balance upon, (2) Load balancing decisions may be performed based on information that cannot be deduced by a load balancer (e.g., application end-point group, externally derived information from Openstack, etc.), (3) Simpler SLB/ADC implementation, and (4) no need to couple SLB and IP management systems.

Addressing Security Concerns

Overall, the SFC Security framework can help provide security for metadata that is being used for load balancing. Metadata used by load balancers can be protected from a security perspective as part of the overall SFC security framework. SFC metadata being used for load balancing does not in itself make security weaker, and SFC can work with crypto and security mechanisms. In one example, SFC can be used in a trusted environment (e.g., a secure data center). In this case if the middle box or classifier is hacked, NSH might not be the biggest problem. All DC tagging schemes (VXLAN for example, even VLANs to some extent have similar issues). In another example, SFC can be used in existing "safe" transports (e.g., IPsec, MACSEC, SSL) to carry NSH. In yet a further example, SFC can be used with NSH specific authenticity and confidentially mechanisms. In these cases, NSH itself can carry the crypto data as metadata. These SFC security approaches can effectively address security concerns over using the (sensitive) metadata being carried in NSH for load balancing Variations and Implementations Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment, The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the network service header features/operations thereof. This may be inclusive of appropriate algorithms and communication protocols that allow for the effective exchange of data or information.

In one implementation, nodes with NSH capabilities may include software to achieve (or to foster) the functions discussed herein for providing the NSH-related and load balancing-related features/functions where the software is executed on one or more processors to carry out the functions. This could include the implementation of instances of load balancing functions, service header processors, and/or any other suitable element that would foster the activities discussed herein. Additionally, each of these elements can have an internal structure (e.g., a processor, a memory element, etc.) to facilitate some of the operations described herein. In other embodiments, these functions may be executed externally to these elements, or included in some other network element to achieve the intended functionality. Alternatively, these nodes may include software (or reciprocating software) that can coordinate with other network elements in order to achieve the functions described herein. In still other embodiments, one or several devices may include any suitable algorithms, hardware, software, components, modules, interfaces, or objects that facilitate the operations thereof.

In certain example implementations, the NSH-related and load balancing-related functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases or metadata disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, service nodes, etc.) can include memory elements for storing information to be used in achieving the NSH-related and load balancing-related features, as outlined herein. Additionally, each of these devices may include a processor that can execute software or an algorithm to perform the NSH-related and load balancing-related features as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of load balancing based on NSH metadata, as potentially applied to a myriad of other architectures.

It is also important to note that the various steps described herein illustrate only some of the possible scenarios that may be executed by, or within, the nodes with NSH capabilities described herein (e.g., load balancer 300 of FIG. 3). Some of these steps may be deleted or removed where appropriate, or these steps may be modified or changed considerably without departing from the scope of the present disclosure.

In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by nodes with NSH capabilities in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for load balancing based on metadata in a network service header, the method comprising:
   receiving, at a load balancer in a service path, a packet or frame of a traffic flow, wherein the packet or frame has a payload and the network service header including metadata and service path information for the traffic flow identifying the service path, the metadata comprises classification information of the packet or frame, and the classification information has application information associated with the traffic flow;
   extracting, by a service header processor of the load balancer, the application formation;
   receiving, at the load balancer, an encoding scheme of the application information; and
   applying, by a load balancing function of the load balancer, a load balancing policy on the packet or frame based on the application information to distribute traffic flows across a plurality of servers.

2. The method of claim 1, wherein the network service header that includes the metadata and the service path information is a result of an initial classification of the packet or frame performed by an initial service classifier.

3. The method of claim 1, wherein the classification information of the packet or frame of the metadata originates from an orchestrator system external to a service path prescribed by the service path information.

4. The method of claim 1, wherein:
   the classification information of the packet or frame of the metadata is a result of metadata augmentation by a service node upstream of the load balancer in the service path; and
   the metadata augmentation by the service node upstream of the load balancer comprises performing a classification of the packet or frame which supplements an initial classification of the packet or frame and augmenting metadata in the network service header with further metadata from the classification.

5. The method of claim 1, wherein the load balancer is not capable of deducing the classification information of the packet or frame based on the packet or frame.

6. The method of claim 1, wherein applying the load balancing policy on the packet or frame does not include processing the payload of the packet or frame.

7. The method of claim 1, wherein applying the load balancing policy on the packet or frame does not include processing the layer 7 Hypertext Transfer Protocol header of the packet or frame.

8. The method of claim 1, wherein the application information comprises an encoded value which identifies an application with which the traffic flow is associated.

9. The method of claim 1, wherein the load balancer is a server load balancer or an application delivery controller in the service path, wherein the service path is prescribed by the service path information.

10. The method of claim 1, wherein the application information comprises one or more of the following: information identifying the application type, application data, subscriber information, service level information, virtual private networks member ship information, and virtual routing and forwarding membership information.

11. The method of claim 1, wherein the encoding scheme is received via a control plane of the service path.

12. A load balancer in a service path for load balancing based on metadata in a network service header, the load balancer comprising:
   at least one memory element having instructions stored thereon;
   at least one processors coupled to the at least one memory element and configured to execute the instructions to cause the load balancer to:
      receive a packet or frame of a traffic flow, wherein the packet or frame has a payload and the network service header including metadata and service path information for the traffic flow identifying the service path, the metadata comprises classification information of the packet or frame, and the classification information has application information associated with the traffic flow;
      extract, by a service header processor of the load balancer, the application information;
      receive an encoding scheme of the application information; and
      apply, by a load balancing function of the load balancer, a load balancing policy on the packet or frame based on the application information to distribute traffic flows across a plurality of servers.

13. The load balancer of claim 12, wherein the network service header that includes the metadata and the service path information is a result of an initial classification of the packet or frame performed by an initial service classifier.

14. The load balancer of claim 12, wherein the classification information of the packet or frame of the metadata originates from an orchestrator system external to a service path prescribed by the service path information.

15. The load balancer of claim 12, wherein the classification information of the packet or frame of the metadata is a result of metadata augmentation by a service node upstream of the load balancer in the service path; and the metadata augmentation by the service node upstream of the load balancer comprises performing a classification of the packet or frame which supplements an initial classification of the packet or frame and augmenting metadata in the network service header with further metadata from the classification.

16. The load balancer of claim 12, wherein the load balancer is not capable of deducing the classification information of the packet or frame of the metadata from the packet or frame.

17. A computer-readable non-transitory medium comprising one or more instructions for load balancing based on metadata in a network service header, that when executed on a processor configure the processor to:

receive, at a load balancer in a service path, a packet or frame of a traffic flow, wherein the packet or frame has a payload and the network service header including metadata and service path information for the traffic flow identifying the service path, the metadata comprises classification information of the packet or frame, and the classification information has application information associated with the traffic flow;

extract, by a service header processor of the load balancer, the application information; and apply, by a load balancing function of the load balancer, a load balancing policy on the packet or frame based on the application information to distribute traffic flows across a plurality of servers.

18. The computer-readable non-transitory medium of claim 17, wherein applying the load balancing policy on the packet or frame does not include processing the payload of the packet or frame.

19. The computer-readable non-transitory medium of claim 17, wherein applying the load balancing policy on the packet or frame does not include processing the layer 7 Hypertext Transfer Protocol header of the packet or frame.

20. The computer-readable non-transitory medium of claim 17, wherein the application information comprises an encoded value identifies an application with which the traffic flow is associated.

* * * * *